United States Patent
Lotfy et al.

(10) Patent No.: US 12,512,904 B2
(45) Date of Patent: *Dec. 30, 2025

(54) SYSTEM AND METHOD FOR SOLAR CELL ARRAY COMMUNICATION

(71) Applicant: AeroVironment, Inc., Arlington, VA (US)

(72) Inventors: Nader Michael Lotfy, Pasadena, CA (US); Eric James Aagaard, Los Angeles, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,844

(22) Filed: Nov. 30, 2023

(65) Prior Publication Data
US 2024/0129025 A1 Apr. 18, 2024

Related U.S. Application Data

(63) Continuation of application No. 17/967,890, filed on Oct. 17, 2022, now Pat. No. 11,876,599, which is a
(Continued)

(51) Int. Cl.
*H04B 7/185* (2006.01)
*H02S 40/38* (2014.01)

(52) U.S. Cl.
CPC ......... *H04B 7/18513* (2013.01); *H02S 40/38* (2014.12)

(58) Field of Classification Search
CPC .. H04B 7/18513; H02S 40/38; G08G 5/0069; G08G 5/0013; G08G 5/0026
See application file for complete search history.

(56) References Cited

U.S. PATENT DOCUMENTS

| | | | |
|---|---|---|---|
| 6,365,825 B1 * | 4/2002 | Hayashi | H01L 31/186 136/258 |
| 2005/0197749 A1 * | 9/2005 | Nichols | G05D 1/0202 701/3 |

(Continued)

FOREIGN PATENT DOCUMENTS

| | | |
|---|---|---|
| AU | 2017425949 A1 | 2/2019 |
| CN | 108680486 A | 10/2018 |

(Continued)

OTHER PUBLICATIONS

International Searching Authority/US; Notification of Transmittal of International Search Report and Written Opinion (1pg.), International Search Report (ISR) (4pgs.), Written Opinion of the International Searching Authority (WO) (6 pgs.), and Search History (6 pgs.) for corresponding PCT/US2020/029979, entitled System And Method For Solar Cell Array Communication, by Lotfy et al., mailed Oct. 16, 2020.

(Continued)

*Primary Examiner* — John J Lee
(74) *Attorney, Agent, or Firm* — Christopher R. Balzan, Esq.; Eric J. Aagaard, Esq.

(57) ABSTRACT

In one implementation, a method for a solar cell array is provided, the method includes emitting a communication message from the solar cell array by reverse biasing the solar cell array so as to cause at least a portion of the solar array to emit a detectable amount of radiation corresponding to the communication message.

7 Claims, 5 Drawing Sheets

Related U.S. Application Data continuation of application No. 17/606,444, filed as application No. PCT/US2020/029979 on Apr. 25, 2020, now Pat. No. 1,149,620.

(60) Provisional application No. 62/893,756, filed on Aug. 29, 2019, provisional application No. 62/838,937, filed on Apr. 25, 2019.

(56) References Cited

U.S. PATENT DOCUMENTS

| | | |
|---|---|---|
| 2007/0146126 A1 | 6/2007 | Wang |
| 2010/0000134 A1 | 1/2010 | Mackler |
| 2016/0218553 A1* | 7/2016 | He .................... H02J 50/30 |
| 2020/0044730 A1 | 2/2020 | Takamori et al. |

FOREIGN PATENT DOCUMENTS

| | | | |
|---|---|---|---|
| EP | 3291309 A1 | 3/2018 | |
| EP | 3663199 A1 * | 6/2020 | ........... B64C 39/024 |

OTHER PUBLICATIONS

European Patent Office; Supplementary European Search Report (2pgs) with Information on Search Strategy (1 pg) and Written Opinion (2 pgs) for corresponding application EP20795855, entitled System And Method For Solar Cell Array Communication, by Lotfy et al.; mailed Jan. 10, 2023.

Intellectual Property Office of Singapore; Written Opinion for corresponding application 11202111425Q, entitled System And Method For Solar Cell Array Communication, by Lotfy et al.; mailed May 16, 2023.

* cited by examiner

SYSTEM AND METHOD FOR SOLAR CELL ARRAY COMMUNICATION

CROSS REFERENCE TO RELATED APPLICATIONS

The present application is a continuation of U.S. application Ser. No. 17/967,890, filed Oct. 17, 2022, entitled SYSTEM AND METHOD FOR SOLAR CELL ARRAY COMMUNICATION, by Lotfy et al., herein incorporated by reference in its entirety, which is a continuation of U.S. application Ser. No. 17/606,444, filed Oct. 25, 2021, entitled SYSTEM AND METHOD FOR SOLAR CELL ARRAY COMMUNICATION, by Lotfy et al., herein incorporated by reference in its entirety, which is a National Stage Application of PCT/US2020/029979, filed Apr. 25, 2020, entitled SYSTEM AND METHOD FOR SOLAR CELL ARRAY COMMUNICATION, by Lotfy et al., herein incorporated by reference in its entirety, which claims the benefit of the following applications, which are all herein incorporated by reference in their entireties:

U.S. Provisional Application No. 62/893,756, filed Aug. 29, 2019, by Nader Lotfy et al., entitled SYSTEM AND METHOD FOR SOLAR CELL ARRAY COMMUNICATION, which is herein incorporated by reference in its entirety; and U.S. Provisional Application No. 62/838,937, filed Apr. 25, 2019, by Nader Lotfy, entitled SYSTEM AND METHOD FOR SOLAR ARRAY DIAGNOSTICS.

BACKGROUND

In certain situations, it may not be possible, practical, or desirable to use conventional communication systems to communicate. In some instances, for example conventional communications are not possible due to equipment failure. In other instances, for example, it may not be desirable to allow conventional communications to be intercepted. In yet other situations, using conventional communications could make the person transmitting detectable.

What is needed is a system and method that can be used in such situations, as well as others.

SUMMARY

In one possible implementation, a method for a solar cell array is provided, the method includes emitting a communication message from the solar cell array by reverse biasing the solar cell array so as to cause at least a portion of the solar array to emit a detectable amount of radiation corresponding to the communication message.

In one possible embodiment, a solar cell array circuit is provided including a solar string comprising a plurality of solar cells coupled together, a charge storage device coupled to a power bus, and a bidirectional boost-buck converter having a first and second pair of MOSFETs connected in series between positive and negative rails of the power bus with an inductor coupled from between the first and second paired MOSFETs to a charging output of the solar string.

In one possible implementation, a method is provided for communicating a message with a solar cell array in a high altitude long endurance aircraft. This particular embodiment includes displaying a message on a solar cell array on the high altitude long endurance aircraft, detecting the message using a satellite, and relaying the detected message from the satellite to a platform below the high altitude long endurance aircraft.

DESCRIPTION

Figure 1:
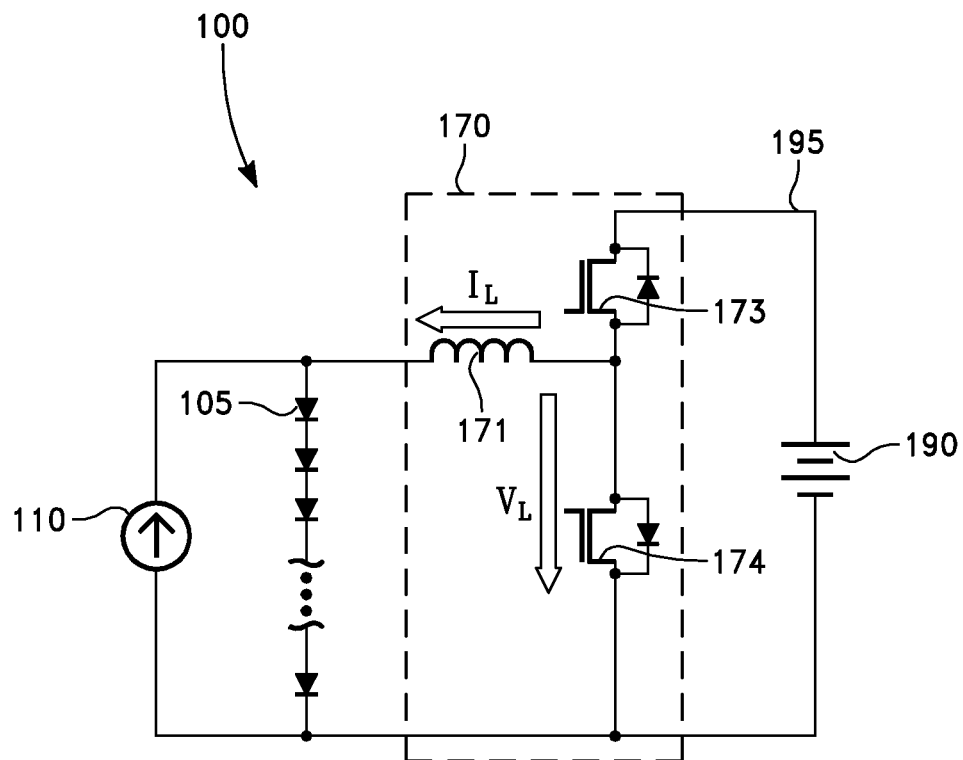
FIG. 1 shows a simplified schematic of a bidirectional circuit for a solar cell array.

In one possible implementation in accordance with the present invention, it is useful to communicate using a solar array as a communication device. To achieve this, selected parts, or all of the solar array may be made to emit radiation instead of its normal function of absorbing sunlight and converting it to electrical power. Thus, in accordance with some embodiments of the present invention, it is possible to bias solar cells to cause them to emit radiation, during times when they are not absorbing it and cause them to emit radiation for communication purposes.

In some implementations, the emitted radiation may be in one or more of the visible light, the infrared, or other spectrum, depending on the solar cell device characteristics. Thus, the solar cells would be selected to perform both normal solar energy conversion, and for its desired communication spectrum. Further, it is envisioned that the solar cells could be tailored to emit certain frequencies for such communication purposes, when not being utilized for solar collection purposes.

Typically, solar cells are used in an array to absorb radiation, and generate electrical power therefrom for use in a system, or for storage for later use. Since solar power use is becoming more widespread. Implementations, in accordance with the present invention provide a new application for solar cells, as communication devices. This can be applied not only to conventional fixed terrestrial applications, but also to other applications of solar cells.

In a particular implementation, solar arrays are utilized in Unmanned Aerial Vehicles (UAVs), aircraft with no onboard pilot, which may fly autonomously, or be remotely piloted. In high altitude long endurance aircraft, a solar cell array may be used as source of power, which the batteries, engines, and other aircraft systems use.

In high altitude long endurance aircraft, for example, the solar cell array is typically positioned on upper surfaces of the aircraft, such as on the upper surfaces of the wings, or on the upper surface of the fuselage, or both. High altitude long endurance aircraft are typically light weight aircraft with large wingspans, sometimes a long as 100 meters or more. Further, they can have high lift wings and can be made to fly relatively slow. The large wingspan of the high altitude long endurance aircraft covered with a solar array provides large surface area for visual viewing during communications. An advantage of using the solar array for communication is that because the array is on the top surface of the wing, the communication is directed upward and not viewable from terrestrial or lower aircraft. It is, however, viewable by satellite detectors, such as optical, infrared, or other frequencies. Thus, the solar array may be utilized for directional communications.

In other applications, solar arrays may be portable, or even wearable. Solar cells, or panels, can be made relatively flexible, so can be affixed to textiles, such as articles of clothing, or to other wearable articles. The wearable solar panel is then be used to charge portable batteries, or battery equipped/powered equipment or devices while being part of a garment or accessory. In such applications, the solar array is further utilized for nearby or distance communications.

The solar array may be configured to operate to radiate in a display mode for communication in the near visible light, visible light, or other detectable spectrum to convey messages. For example, in a wearable article of clothing, the wearer could cause messages to emit in visible light from the article of clothing to communicate line of sight messages. Similarly, in solar assisted/powered automobiles, solar cells, or arrays, could be used to indicated position or to communicate driver intention (as blinker or other indicator/communication light), or to flash messages.

In the case of an aircraft, the direction of communications may be adjusted by adjusting the aircraft orientation, which changes the orientation of the solar array. Similarly, the orientation of satellites, or of actuatable terrestrial solar panels, could be adjusted to change the communication direction. In the case of portable devices, including wearable solar arrays, the orientation of the portable device, or the wearable device may be adjusted to direct communications.

FIG. 1 shows a simplified schematic of a bidirectional circuit 100 for a solar cell array. The solar cells may be arranged into solar strings 110 having several solar cells 105 coupled together. In this embodiment, the solar string 110 is coupled to the power bus 195 via a two quadrant bidirectional boost-buck converter 170. Thus, the solar string 110 is coupled to the power bus 195 via inductor 171, such as for example, about 300 to 600 micro Henries, between a MOSFET 173 and a MOSFET 174. The MOSFET 173 and the MOSFET 174 are connected in series between the positive and negative rails of the power bus 195. The control input gates of the MOSFETs 173 and 174 are connected to a microcontroller for modulating the control inputs so as to cause the converter 170 to supply current from the solar string 110 to the bus 195 in charging mode, or to draw current from the bus 195 to drive the solar string 110 to emit radiation in display mode. In the charging configuration, the MOSFET 174 is modulated, such as pulse width modulated, while MOSFET 173 is either modulated or just used as a diode to supply power to the bus 195 for charging. In display configuration, MOSFET 173 is modulated, while MOSFET 174 is open, or modulated.

The solar strings 110 may include several nearby solar panels, which could be linear, square, rectangular, or other geometric configuration of solar panels. Or, the solar panels in a string may be spaced so as to enable display of patterns, characters, letter, numbers, symbols, images, machine readable type linear or matrix bar coding, or the like, to allow communication, either by direct, coded, or even aesthetic communication. The display may be time variant or encoded messages, such as emission duration encoded, or frequency encoded messages, or even intensity encoded, or other known encoding method.

In one simplified example, the solar cell could emit messages by optical Morse code. Or, in another simplified example, a bar coded message, or character message could be statically displayed, or dynamically scrolled across the wingspan of a high altitude long duration unmanned aircraft. In one possible scenario, the displayed message could be in response to received messages when the aircraft is unable to otherwise transmit via normal communication channels, i.e. where the aircraft's transmitter is not functioning, or where general open transmission of the message is not desirable.

In another possible application, such as wearable, other mobile, or even fixed terrestrial applications, the solar cells could be selected to emit only an infrared spectrum signal, which could be detected only with infrared detection means, such as infrared/night vision goggles, portable infrared detectors, such as binoculars or other handheld infrared detection devices, and/or by aircraft forward or side looking infrared detectors, for example.

In still another useful application, a stranded, lost, or person not able to move from their position, could utilize the display mode on the solar device to transmit an SOS, another signal or message, or to merely illuminate, such as in the visual, or IR spectrum for identification or rescue at night using optical, or IR detection means, i.e. binoculars or IR imaging devices, such as IR goggles. As such, for use in communication the display emits a detectable amount of radiation such that it may be observed either directly unaided, or with the aid of an electronic detector capable of detecting in the displayed spectrum and converting it to an directly observable radiation, or by converting it to information, i.e. such as night or regular vision collection and/or amplification, conversion from one or more spectrum to another, detection and conversion for an information display, such as a handheld device display, projection display, a display monitor, a readable or textual display, a location identification display, a mapping display, or the like.

Some embodiments can display information generated by an aircraft where the inputs are detected by the aircraft onboard sensors. This display could be coordinated to display vehicle conditions, such as vehicle speed.

Figure 2A:
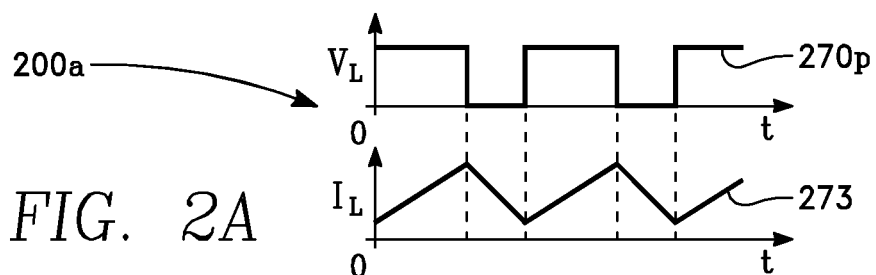
FIG. 2A is a timing diagram showing operation of the bi-directional circuit in both the charging mode.
Figure 2B:
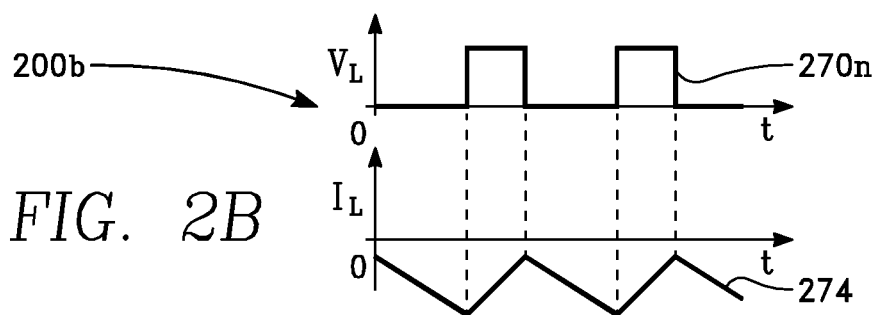
FIG. 2B is a timing diagram showing operation of the bi-directional circuit in the display mode.

FIGS. 2A & 2B are timing diagrams 200a and 200b showing operation of the bi-directional buck-boost converter in both the charging mode and in the display mode. The MOSFET 173 and the MOSFET 174 are operated by adjusting the duty cycle and pulse width of the MOSFETS 173 and 174 in a complementary fashion to provide the charge mode and the display mode. In the charge mode, the duty cycle of MOSFET 174 is increased with respect to the MOSFET 173. In the display mode, the MOSFET 173 is increased with respect to the MOSFET 174.

The timing diagrams 200a and 200b show example timing plots 200a and 200b illustrate how pulse width modulation of MOSFET 173 and the MOSFET 174, respectively, will produce/allow the positive or negative current $I_L$ flow generated from of the solar string 110 during charging, or into the solar string 110 from the power bus 195 during display mode. Timing plot 200a shows how the positive voltage $V_L$ pulse train 270p, with respect to ground, applied to the battery 190 side of the inductor 171 produces a positive current $I_L$, while the other plot 200b produces negative current $I_L$. For each plot 200a and 200b, there is a voltage $V_L$ pulse train 270p and 270n above its resultant current $I_L$ plot 273 and 274, respectively. The MOSFETS 173 and 174 pulsed to cause voltage $V_L$ square wave pulses 270p or 270n to produce positive 273 or negative 274 sawtooth current $I_L$. The wider voltage pulses 270p contribute a positive current $I_L$, while the narrower pulses 270n contribute a negative current $I_L$. This will allow either normal charge mode charging operation of the solar string 105, or display mode display operation of the solar string 105.

Figure 3:
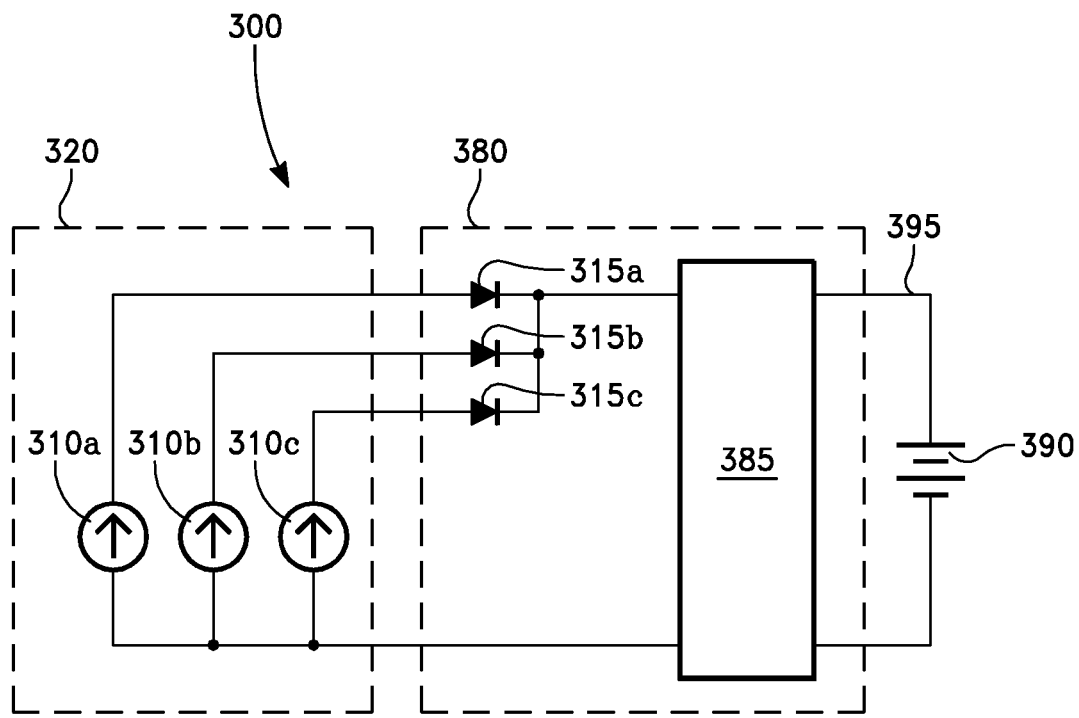
FIG. 3 is a simplified diagram of a circuit having a solar array.

FIG. 3 is a simplified diagram of a circuit 300 having a solar array. Typically, several independent solar arrays or strings 310a, 310b, and 310c connected in parallel to form a channel 320. In some embodiments, a string may have a number of replaceable solar panels, for example. Each of the strings 310a, 310b, and 310c is provided with a serial connected blocking diode 315a, 315b, and 315c. The blocking diode 315a, 315b, and 315c are provided in case one of the strings 310a, 310b, and 310c shorts, to prevent one of the strings 310a, 310b, or 310c from causing shorting, or other failure, in the other non-shorted strings 310a, 310b, or 310c. Although the blocking diodes add an amount of loss to the system, they are required to reduce failures of associated the solar cells within the array, or other components within the system.

The blocking diodes are typically located within a power tracker 380, which also has a boost stage 385 DC/DC converter. The boost stage 385 decouples the supplied voltage and the current from the high voltage power bus 395, i.e. 270V-400V, that is connected to the battery 390, and is configured so that proper voltage is supplied on the high voltage power bus regardless of the voltage and current supplied by the solar array. In one embodiment, the power tracker is a maximum power point tracker or MPPT controller configured to boost voltage from the solar array to the output and to adjust a boost ratio to get the maximum power from the solar array. Examples of MPPT controllers include Outback® FLEXmax 60/80 MPPT, Xantrex® MPPT Solar Charge Controller, and Blue Sky® Solar Charge Controller. Generally speaking, the MPPT controller is configured to maximize the available power going into the battery from the solar array. This is important in various high altitude long endurance aircraft applications where the maximum voltage is a function of the temperature and illumination of the solar array, both of which may vary throughout the day.

With the circuit of FIG. 3, however, display mode is not possible because the diodes 315a, 315b, and 315c prevent reverse biasing of the solar strings 310a, 310b, or 310c. The embodiments of FIG. 4, and FIG. 5, discussed below, permit display mode because it is possible to reverse bias the solar cells 105.

Figure 4:
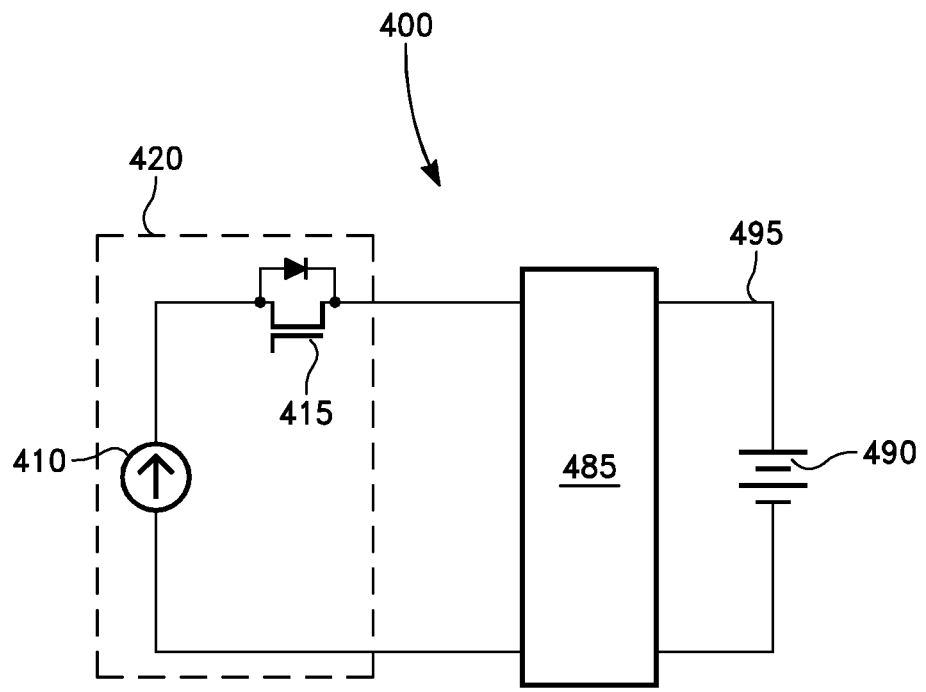
FIG. 4 is a simplified diagram of an improved circuit for a solar array.

FIG. 4 is a simplified diagram of an improved circuit 400 for a solar array. In this embodiment, in place of the blocking diodes 315a, 315b, or 315c (FIG. 3), a solar string control MOSFET 415 is used in the channel 410. This configuration is more efficient than the circuit of FIG. 3 because it eliminates the voltage drop loss across a diode 315a, 315b, or 316c when the solar string control MOSFET 415 is turned on. This embodiment, however, when the solar string control MOSFET 415 is turned on, it does not inherently provide isolate between parallel connected solar strings in the event there is a short in a solar string 410.

As such, in this embodiment, the voltage drop across the solar string control MOSFET 415 is detected and monitored so as to determine the magnitude and direction of the current in the solar string 410 to determine whether another solar string (not shown) has shorted. If it is determined, based on the monitoring of several parallel connected strings, that one of the solar strings has shorted, the solar string control MOSFET in line with the shorted solar string is opened so as not to damage the other parallel connected solar strings.

With the solar string control MOSFET 415 open, it performs as a diode as in FIG. 3, to block current through the shorted solar string.

Thus, the embodiment of FIG. 4 provides a more efficient power transfer, but requires monitoring of the current in the solar string 410 to determine if a short has occurred in the solar string 410, or in any of the associated strings. Typically, the monitoring and control of the solar string control MOSFET 415 is conducted by a power tracker, or other associated electronics. The power tracker includes the solar string control MOSFET 415 and the boost stage 485, which supplies power to the power bus 495.

Figure 5:
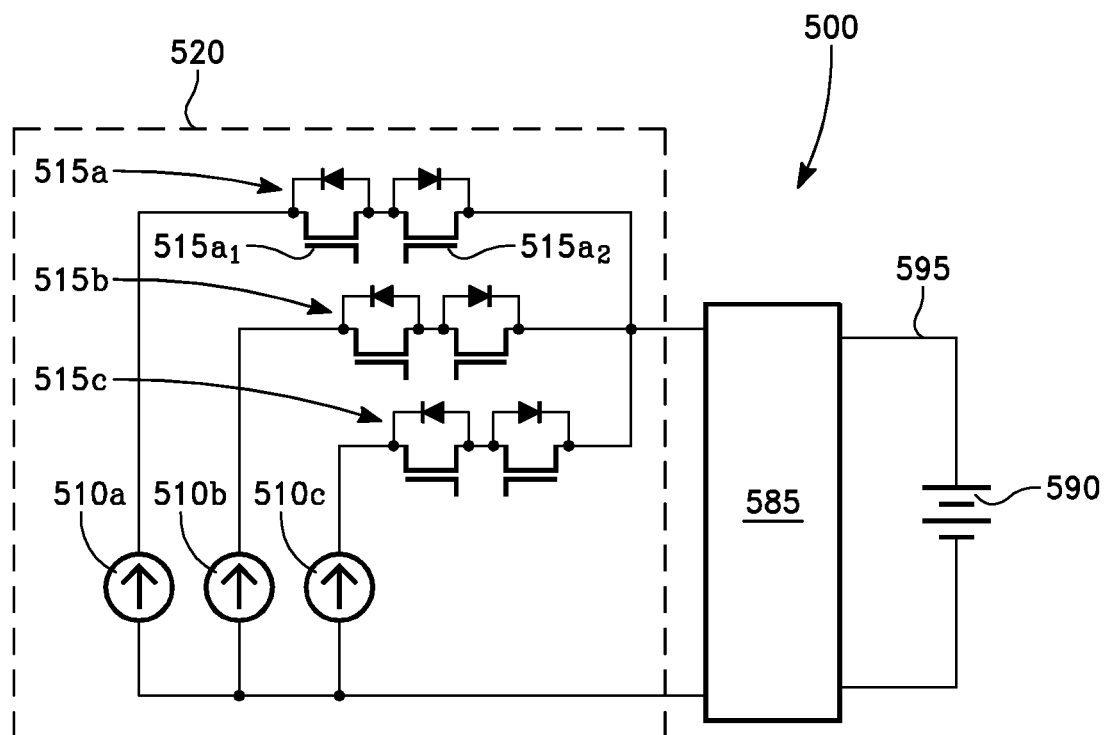
FIG. 5 is a simplified diagram of an improved circuit for a solar array.

FIG. 5 is a simplified diagram of an improved circuit 500 for a solar array. In this embodiment, in place of the blocking diodes 315a, 315b, and 315c (FIG. 3), MOSFET switches 515a, 515b, and 515c are utilized having back-to-back MOSFETS devices $515a_1$ and $515a_2$. The MOSFET switch allows each string 510a, 510b, or 510c in the channel 520 to be individually completely disable or open, even though the output of multiple strings go into a single power stage, such as a boost stage 585 DC/DC converter, which supplies current to the power bus 595 for charging the battery 590. The boost converter 585 controls the MOSFET switches 510a, 510b, or 510c and utilizes the detected string voltages to determine the health of the strings 510a, 510b, or 510c along with all the other strings (not show) and channels (not show) over the entire solar array. An advantage of this it that it allows the system to target each string 510a, 510b, or 510c and perform a lot of diagnostics in flight, such as short circuit current, open circuit voltage, on a per string basis.

Replacing the protection diodes with MOSFET switches is undesirable in a terrestrial solar system because it increases the cost of the system. Using the MOSFET switches, however, is very desirable in high altitude long endurance aircraft, where it is significant and important to extract the maximum energy from the solar array. MOSFET switches can be selected to have lower power loss across the switch as compared to a protection diode. As, such it increases the efficiency of the charging system, and also allows you to predict (through trend analysis) and detect failures much easier. Imminent failures can be predicted and action taken before a failure becomes critical. This is important in high altitude long duration aircraft, so as to enable avoidance of a critical failure that could otherwise lead to a power off, or even a crash landing. Since strings can be individually tested, it provides much more "visibility" into the functionality and health of the solar array in flight.

Moreover, each string can be tested in flight to determine the optimal power output for each string individually according to its V-I and power output characteristic. As such, the string characteristics can be tested over time to determine the health of the string. This is particularly important during long duration flights, and during high altitude flights, so that the need for maintenance and/or remedial measures, such as solar panel replacement, can be anticipated and made when convenient.

In some embodiments, each string includes a number of solar panels grouped generally spanwise along the wing of the aircraft, for example four, five, or six smaller solar panels are grouped per string. The solar panels are grouped in this way so that the solar panels in a string experience similar environmental and operational conditions together. For example, the solar panels at the leading edge of the wing may be grouped together in a string, while solar panels near the trailing edge of the wing may be grouped together, possibly with one or more strings also extending spanwise or laterally along the span of the wing, between the leading and trailing edge strings.

In high altitude applications, the grouping of the solar panels into strings is significant. This is because the temperature can vary greatly from the leading to the trailing edge of the wing. Further, the orientation of the aircraft with respect to the sun, in elevation, azimuth, rotation, etc., as well as having a greater curvature from leading to trailing edges of the wing, can further exaggerate the temperature differential. In high altitude long endurance solar powered aircraft, the temperature can range across the wing from –60 degrees Celsius on the leading edge to +60 degrees Celsius on the trailing edge of the wing. As such, grouping solar panels into strings combined with being able to individually switch on or off individual strings based on the performance of a string allows for more efficient solar power generation.

Figure 6:
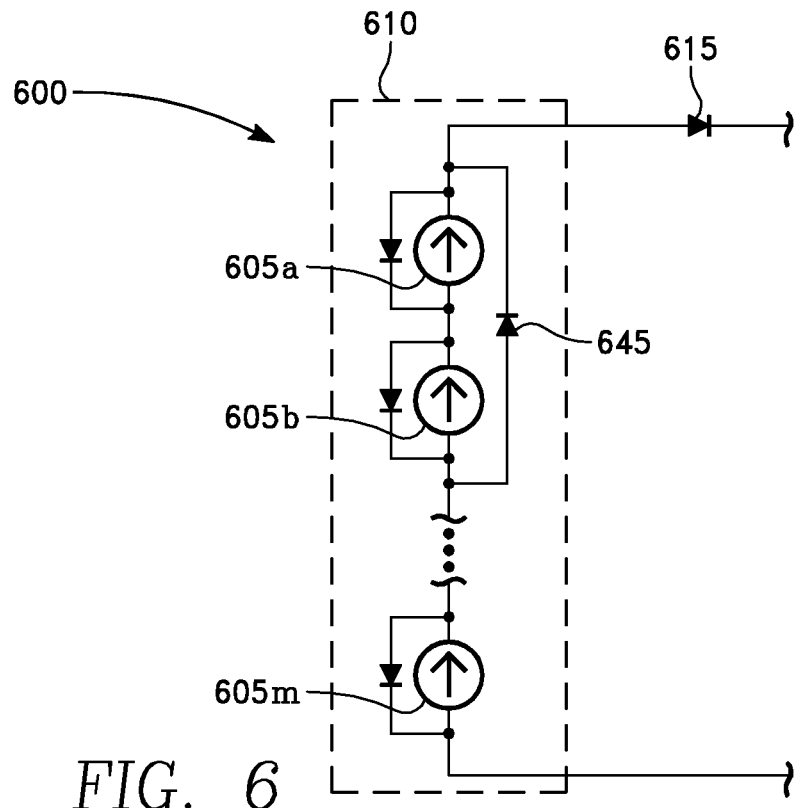
FIG. 6 is a simplified diagram of a string circuit.

Turning to FIG. 6, shown is a simplified diagram of a string circuit 600. In FIG. 6, the string 600 typically has a bypass diode 645 in parallel with two or more solar cells 605a and 605b. The bypass diode 645 allows the other solar cells 605m to supply current around the solar cells 305a and 605b when one or more of the solar cells becomes non-functional or an open circuit, such as by being cracked, or broken.

Figure 7:
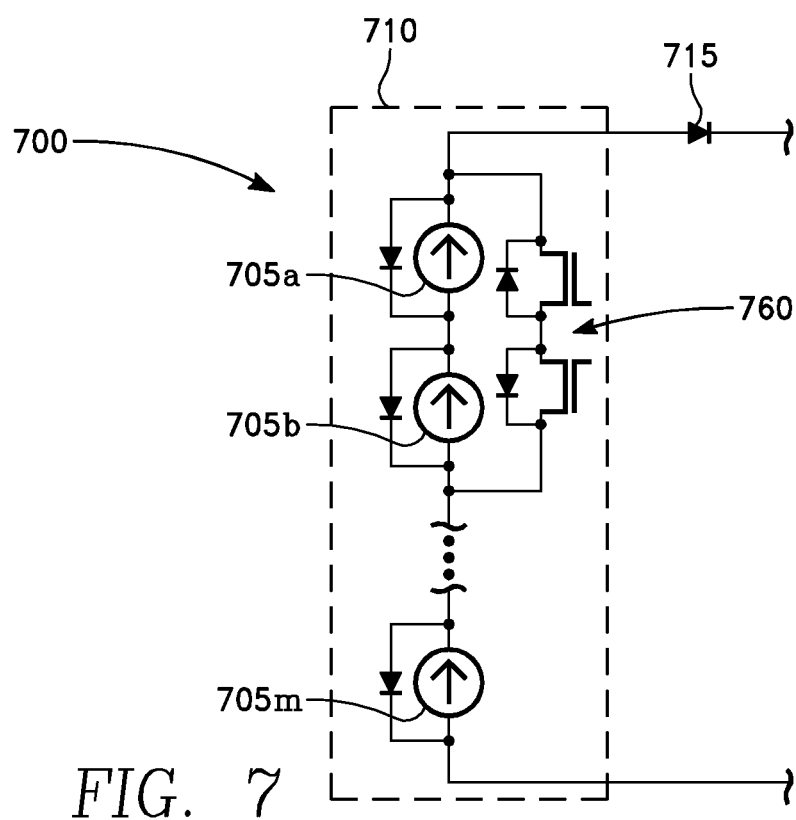
FIG. 7 is a simplified diagram of an improved solar string circuit.

With reference to FIG. 6, in a further embodiment, the bypass diode 615 is replaced by a bypass MOSFET switch 760 as shown in the simplified diagram of a solar string circuit 700 of FIG. 7. Such an embodiment, allows further efficiency over the diode when a solar cell 605a, 605b, . . . or 605m (FIG. 6) fails, due to the lower power loss associated with a MOSFET switch 760 as compared to the bypass diode 645. Furthermore, it allows for closer monitoring and predictive analysis of individual, or a small group of solar cells for better predictive analysis of the string. As the maximum allowable current for the string 710 is restricted by the restriction of the lowest individual solar cell, being able to bypass only one or several individual solar cells 705a and 705b, or others, can be used to optimize power output of the string 710.

One advantage of various embodiments over string circuits using blocking diodes, is that the blocking diodes can contribute a loss of about 0.7%, whereas MOSFET switches can reduce those losses. Though discussed above with respect to a MOSFET switch, other comparable type switch, i.e. light weight, low loss switch, could be utilized in other embodiments. Furthermore, although shown in FIG. 5 with only three solar strings in a channel for illustration purposes, embodiments may contain two or more strings, and multiple channels.

Various embodiments enable, or expand the capability to run in-flight diagnostics. In high altitude long endurance solar power aircraft, factors such as turbulence, frequent and extreme thermal, motor vibrations can increase the possibility of failure. Various embodiments, provide performance tracking over time, with trend analysis, and can enable eminent failure detection, more flexible scheduling of service/periodic maintenance, and avoidance of lack of airborne network capability/coverage or surveillance capability/coverage in the coverage area. This is particularly important if the high altitude long endurance aircraft is being used as a cellular repeater or for other network communications in area that would otherwise be without coverage should the platform be missing from the network.

Figure 8:
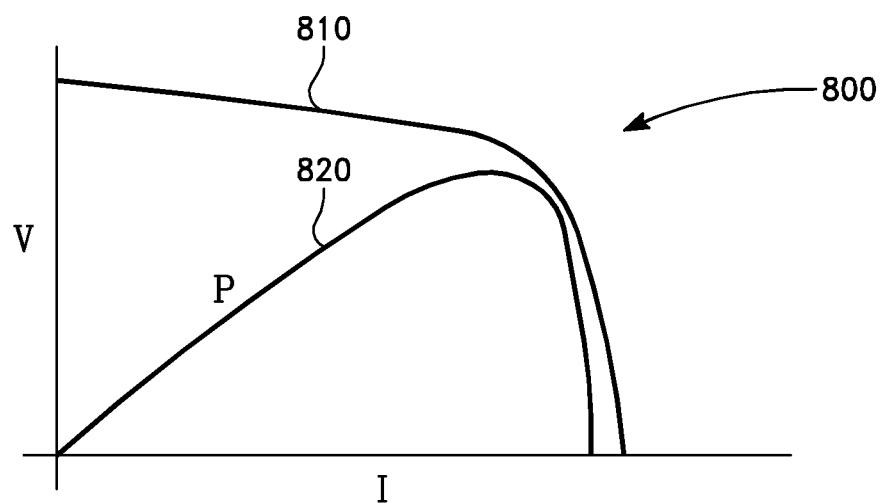
FIG. 8 is a plot showing an example V-I curve of voltage versus current for a typical solar array system.

FIG. 8 is a plot 800 showing an example V-I curve 810 of voltage versus current for a typical solar array system. The power curve 820 for the solar array system is superimposed on the plot 800. It is desirable to extract the maximum power from the solar array system. As such, it is desirable to operate along the V-I curve 810 where the power for the system is at its peak.

Figure 9:
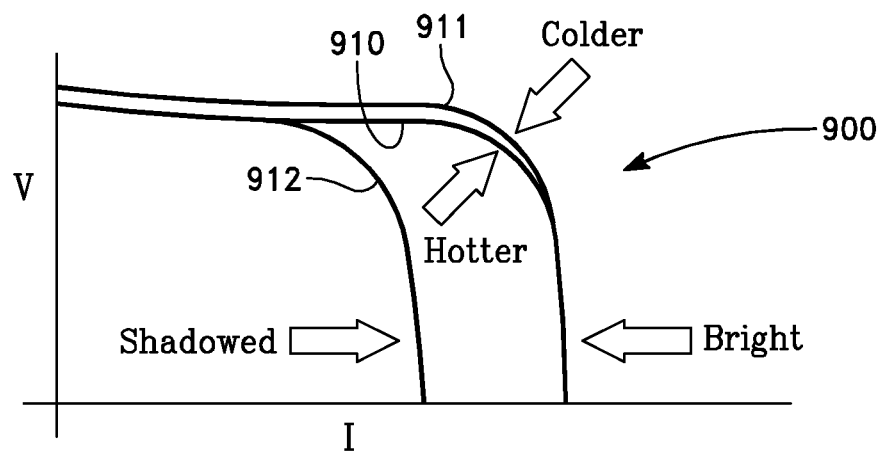
FIG. 9 is a plot illustrating an example V-I curve of voltage versus current for a solar array system for high performance solar cell utilized in high altitude long endurance aircraft implementations.

FIG. 9 is a plot 900 showing an example V-I curve 210 of voltage versus current for a solar array system for high performance solar cell utilized in high altitude long endurance aircraft implementations. In various high performance solar cell implementations which may be utilized in high altitude long endurance aircraft, the V-I curve 910 and the power curve (not shown) have a very steep slope as they approach the maximum current. Thus, the optimum operating point of the system lies with a narrow operating range. If the current is too great by even a slight amount, the voltage goes to zero or short circuits very easily. For example, the difference between optimum power output and short circuit can be as low as 100 mA of current per channel 120 (FIG. 1). Depending on solar cell and channel configuration, this could be even lower in some embodiments, such as 75 mA, 50 mA, 25 mA, or less. To avoid this while achieving the highest power output, a voltage loop is utilized to monitor voltage while determining the peak power operating point, as well as monitoring the current and power. This is because the change in voltage is much bigger than either the power or the current near this point.

Thus, to find the optimum operating point of the system, the current is regulated, while monitoring the voltage as well as the power. The commanded current is varied by power point tracker circuitry, while monitoring power. Additionally, the voltage is also monitored to determine when the power output is maximized because the rate of change of the voltage is greater than the rate of change of the power at near the maximum power output operating point.

To achieve the most efficiency in some embodiments, the voltage is monitored at a faster rate than the current and power. In some embodiments, the voltage may be monitored ten time faster than the current or power. For example, the current and/or power may be monitored at 10 times a second, while the voltage is monitored at 100 time a second.

This enables various embodiments to extract the most amount of solar power from the solar panels in high altitude long endurance aircraft applications, without drawing too much current and sending the voltage to zero, thereby shorting the solar cell.

It is important to note that factors such as the solar panel temperature and the amount of solar exposure can shift the maximum power operating point. In high altitude long endurance solar powered aircraft, these factors are more significant because the temperature range across the solar cells is more extreme, as discussed further below, and the shading or shadowing is typically experienced more frequently and to a greater degree. Thus, monitoring and adjusting the operating point is especially important in high altitude long endurance solar powered aircraft. FIG. 9 depicts example V-I curves for hotter temperature 910 and colder temperature 911 for higher solar intensity or bright solar exposure 910, and lower solar intensity or shadowed solar exposure 912.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A method for communicating a message with a solar cell array in a high altitude long endurance aircraft, the method comprising:
    a) displaying a message on a solar cell array on the high altitude long endurance aircraft;
    b) detecting the message using a satellite; and
    c) relaying the detected message from the satellite to a platform below the high altitude long endurance aircraft.

2. The method of claim 1 further comprising reverse biasing selective solar strings so as to emit a message from the solar cell array comprising at least one of a pattern, character, letter, number, symbol, image, or combination thereof.

3. The method of claim 2, wherein displaying the message comprises emitting at least one of a direct, coded, or aesthetic message.

4. The method of claim 2, wherein displaying the message comprises emitting at least one of a time variant, or intensity variant encoded message.

5. The method of claim 4, wherein displaying the message comprises emitting at least one of a duration encoded, a frequency encoded, or an intensity encoded message.

6. The method of claim 1, wherein displaying the message comprises emitting at least one of (1) a visible light message; or (2) an infrared message.

7. The method of claim 1, wherein displaying the message comprises displaying a visual display message on the solar cell array.

\* \* \* \* \*